June 14, 1938.  R. T. KRIEBEL  2,120,365
NEW AND IMPROVED VIEWING DEVICE FOR USE IN THE
EXAMINATION OF PHOTOELASTIC EFFECTS
Filed Dec. 21, 1936
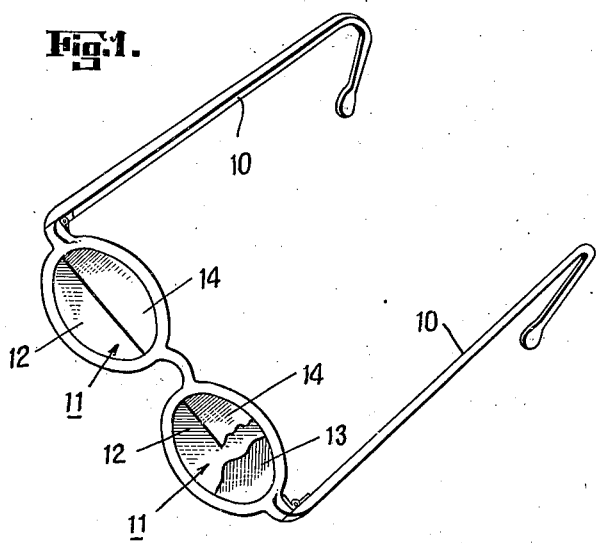
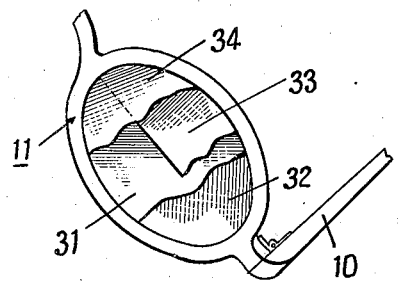
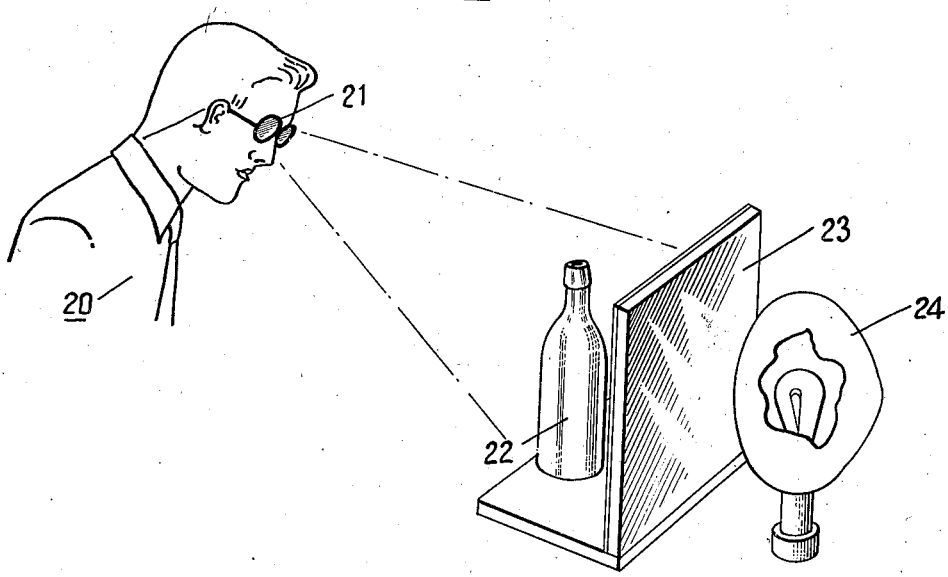
INVENTOR.
Richard T. Kriebel
BY
Brown & Jones
ATTORNEYS.

Patented June 14, 1938

2,120,365

UNITED STATES PATENT OFFICE 2,120,365

NEW AND IMPROVED VIEWING DEVICE FOR USE IN THE EXAMINATION OF PHOTO-ELASTIC EFFECTS

Richard T. Kriebel, Waban, Mass., assignor to Sheet Polarizer Company, Inc., Union City, N. J., a corporation of New Jersey Application December 21, 1936, Serial No. 116,972

5 Claims. (Cl. 88—14)

This invention relates to a new and improved device for use in the examination of photo-elastic effects, and has for its object the provision of an analyzer in the form of an ophthalmic mounting or spectacle frame and suitable light-transmitting elements for use in connection with suitable light-polarizing means for the examination of strain or photo-elastic effects in light-transmitting objects.

A further object of the invention is to provide an analyzing device of the type described which is light and durable, and which may be readily manufactured, and which may be worn by the user without discomfort.

A still further object of the invention is to provide a device of the character described comprising, in combination with a relatively thin, sheet-like, light-polarizing element, a sensitive tint plate or like element, and to provide such sensitive tint plate or like element in intimate contact with said light-polarizing element, and to provide ophthalmic mounting means to suitably hold and position both elements.

A still further object of the invention is to provide an analyzing device of the character described comprising a sensitive tint plate or like element positioned to intercept a portion only of the light traversing the polarizing element associated with the analyzing device whereby the user may, at his option, view the object under test through the sensitive tint plate and the polarizing device, or through the polarizing device of the analyzer alone without altering the position of the viewing device.

A still further object is to provide a plurality of analyzing devices of the character described, one positioned before each eye of the observer, and means to hold the devices in proper operative position.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, in which:

Figure 1 represents a perspective view with parts broken away of one form of device embodying my invention;

Fig. 2 represents a diagrammatic view in perspective—illustrating how the device of the invention may be employed in the examination of strain or photo-elastic effects; and Fig. 3 represents a device embodying a modified form of the invention, parts being broken away for clarity.

Heretofore, in the examination of objects for strain or photo-elastic effects, the object has been positioned between a plurality of light-polarizing elements usually positioned with their polarizing axes at substantially right angles to each other, so that the field of view of the device is dark. It is common practice to position between the object under examination and the analyzing polarizer of the device, a sensitive tint plate or like element adapted to effect a full wave retardation of a portion of the visible spectrum, for example, the yellow green portion, and more or less than a full wave retardation for the remaining portions of the visible spectrum, for example, the red and blue. Where such a plate or device is employed, the field of view is tinted and may appear reddish, and strains in the object under examination may appear in a different color, for example bluish, and thus be somewhat more readily detected than when no sensitive tine plate or similar device is employed.

This invention contemplates the provision of an analyzing device comprising a polarizing element and a sensitive tint plate or similar device which may be worn by the observer and which may be provided for example in the form of spectacles, so that the observer may shift his position with respect to the object under examination and the polarizing element of the strain-testing combination as a whole. Such a viewing device is shown in Fig. 1, where 10 represents any suitable ophthalmic frame, such for example as a spectacle frame, and where 11 represents the right and left eye analyzing screens or filters. These may comprise light-polarizing elements 12 adhesively affixed, for example, to rigid supporting plates such as plates of glass 13. The light-polarizing elements may have affixed to their outer faces, i. e., to the faces furthest removed from the eyes of the observer when the device is being employed, sensitive tint plates or like devices 14, which may be adhesively affixed to the light-polarizing elements 12 and which may preferably be so shaped as to cover a predetermined portion of each element only, such for example as one-half each element, as for example the lower half or the upper half, as shown in Fig. 1.

In Fig. 2 there is illustrated somewhat diagrammatically the manner in which the device shown in Fig. 1 may be employed. 20 represents the user of the device, which is shown at 21. The user is shown as observing an object 22 positioned in front of a light-polarizing element 23, which in turn is positioned before any suitable light source 24. Here also, the polarizing element 23 may preferably comprise a sheet of light-polarizing material, such for example as the material now made and sold under the trade name Polaroid, adhesively affixed over one of its faces to a rigid transparent supporting element, such for example as a sheet of glass or set plastic. This polarizing element may preferably be so positioned with respect to the light source that the supporting element is between the polarizer and the light source. A preferred system is one wherein the polarizing element 23 may be so positioned with respect to the polarizing elements 12 in the analyzing device that their planes of polarization are crossed, i. e., if the element 23 is adapted to transmit light vibrating in a vertical plane, the elements 12 should preferably be positioned to transmit light vibrating in a horizontal plane.

It is to be understood that while Polaroid, which is a set suspension of oriented polarizing particles in a light-transmitting plastic, is a preferred material for use in the invention, any other suitable, thin, light-polarizing material may be employed. It is highly desirable, however, that the analyzing glasses be compact and not bulky, and that they be light in weight and of the form and shape generally of ordinary reading glasses, so that they may be employed without discomfort by the wearer. Such glasses may be readily made where Polaroid is employed as the polarizing material used, for Polaroid is extremely thin, highly efficient, durable, and substantially neutral in color.

The sensitive tint plate employed may comprise any suitable material, for example Cellophane, of such thickness as to impart the desired retardation to the transmitted beam. Where Polaroid is employed as the light-polarizing material, a suitable bond may be effected between the Polaroid and the glass or other supporting element 13 and the Polaroid and Cellophane or other sensitive tint plate 14 by employing an adhesive comprising a vinyl compound such as the material now made and sold under the trade name Vinylite AF plasticized with dibutyl phthalate. Vinylite AF is a highly polymerized vinyl acetate.

Any other suitable material may be employed for the sensitive tint element, such for example as the conventional selenite or gypsum plates, or any other crystalline or doubly refractive material adapted to give the desired result.

The operation of the device will be apparent from the description of Fig. 1. If the observer who is examining the object under test desires to employ a sensitive tint plate, he need only slightly incline his head so that light traversing the object passes through the sensitive tint elements 14 and the polarizing elements 12 before reaching his eyes. If he wishes to examine the object without employing a sensitive tint plate he need only raise his head so that light reaching his eyes passes through only the polarizing elements of the analyzing device. The principal axes of the sensitive tint elements should be positioned in the usual manner at an angle of 45° to the polarizing axes of the polarizing elements 12.

In Fig. 3, a modified form of the invention is shown, employing circularly polarized light. Here, the viewing device comprises a polarizing element 31 affixed to a supporting plate 32 and having a sensitive tint element 33 and a quarter wave device 34 affixed thereto. The quarter wave device may comprise, for example, a sheet of cellulose acetate having such molecular orientation and being of such thickness as to effect the desired result, mounted with its axis at an angle of 45° to the polarizing axis of the element 31. It will be understood that where such a device is used, the polarizing elements of the strain tester unit should also be adapted to transmit circularly polarized light.

It will be obvious that the analyzing device, in any embodiment of the invention, may be employed, if desired, without using the sensitive tint plate or like element.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and useful and desire to secure by Letters Patent is:

1. A device of the character described comprising, in combination, an ophthalmic frame, a thin, sheet-like, light-polarizing element held by said frame and a sensitive tint device of less area than said light polarizing element held by said frame adjacent said light-polarizing element to overlie only a portion thereof such that the user may look either through the light-polarizing element alone or through the polarizing element and the sensitive tint device in combination, said light-polarizing element being so positioned as to be between said sensitive tint device and the eye of an observer wearing said frame.

2. A device of the character described comprising, in combination, an ophthalmic frame, a thin, sheet-like, light-polarizing element held by said frame, and a sensitive tint device of less area than said light polarizing element, held by said frame adjacent said light-polarizing element to overlie only the upper portion thereof, said light-polarizing element being so positioned as to be between said sensitive tint device and the eye of an observer wearing said frame.

3. A viewing device for observing a polarized beam comprising, in combination, an ophthalmic frame and a thin, sheet-like, light-polarizing element held by said frame before each eye of an observer using said analyzing device, each of the polarizing elements in said analyzing device being positioned with its polarizing axis at an angle of approximately 90° to the direction of vibration of said polarized beam, said analyzing device comprising sensitive tint elements positioned to overlie a portion only of each of said polarizing elements such that the user may look either through the light-polarizing elements alone or through the polarizing elements and tint plates in combination.

4. A device of the character described comprising, in combination, an ophthalmic frame, a thin, sheet-like, light-polarizing element held by said frame, a sensitive tint device of less area than said light polarizing element positioned to overlie only a portion of said light-polarizing element such that the user may look either through the light-polarizing element alone or through the polarizing element and the sensitive tint device in combination, and a quarter wave device positioned to overlie substantially all of said polarizing element and said sensitive tint device, said polarizing element being positioned adjacent the eye of an observer wearing said frame.

5. A device of the character described comprising, in combination, an ophthalmic frame providing two lens apertures, a thin, sheet-like light-polarizing element held by said frame in each of said apertures, the polarizing axes of said elements being in substantial parallelism, sensitive tint devices of less area than said light polarizing elements, one of said devices being affixed to each of said elements to overlie only a portion thereof such that the observer may look either through the polarizing elements alone or through the polarizing elements and tint devices in combination, said light polarizing elements being positioned so as to be between said sensitive tint devices and the eyes of an observer wearing said frame.

RICHARD T. KRIEBEL.